O. KNOERZER.
BEET TOPPER FOR BEET HARVESTERS.
APPLICATION FILED NOV. 1, 1909.
998,851.
Patented July 25, 1911.
2 SHEETS—SHEET 1.
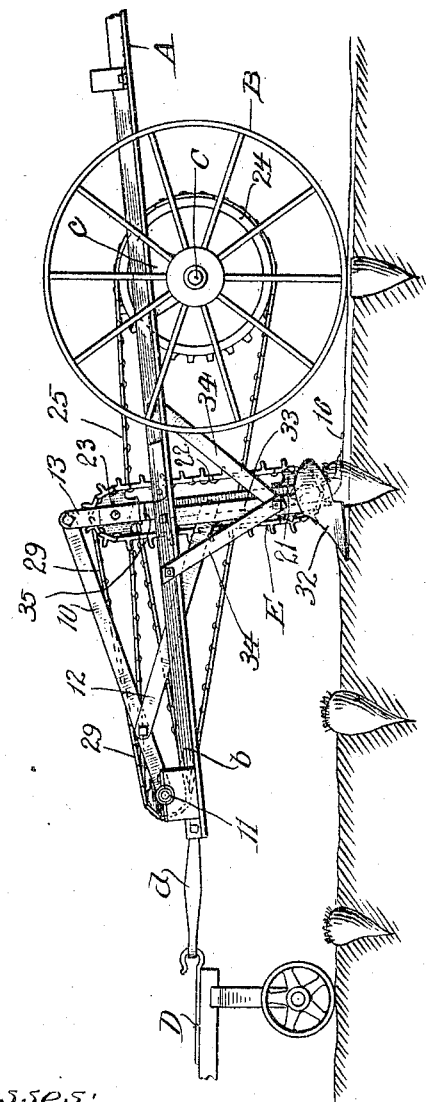
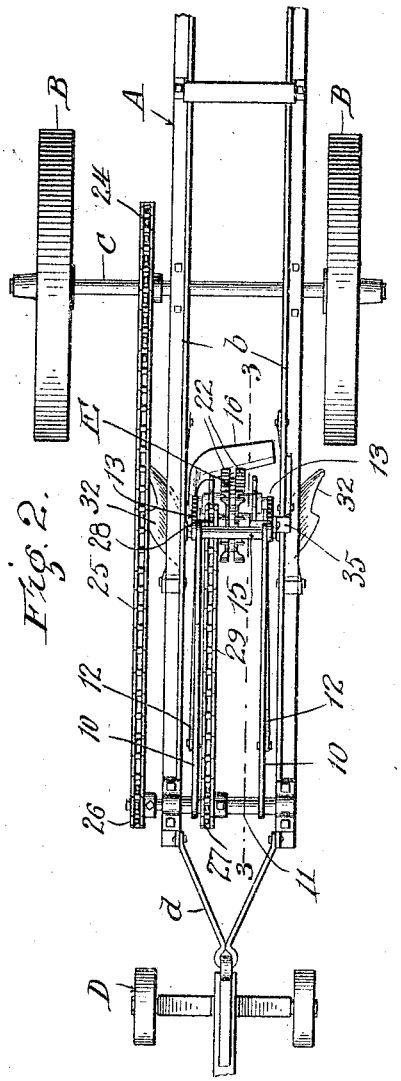
Witnesses:
Fannie F. Richards
Henry Lindanger
Inventor:
Otto Knoerzer,
by Charles O. Shirey
his Atty.

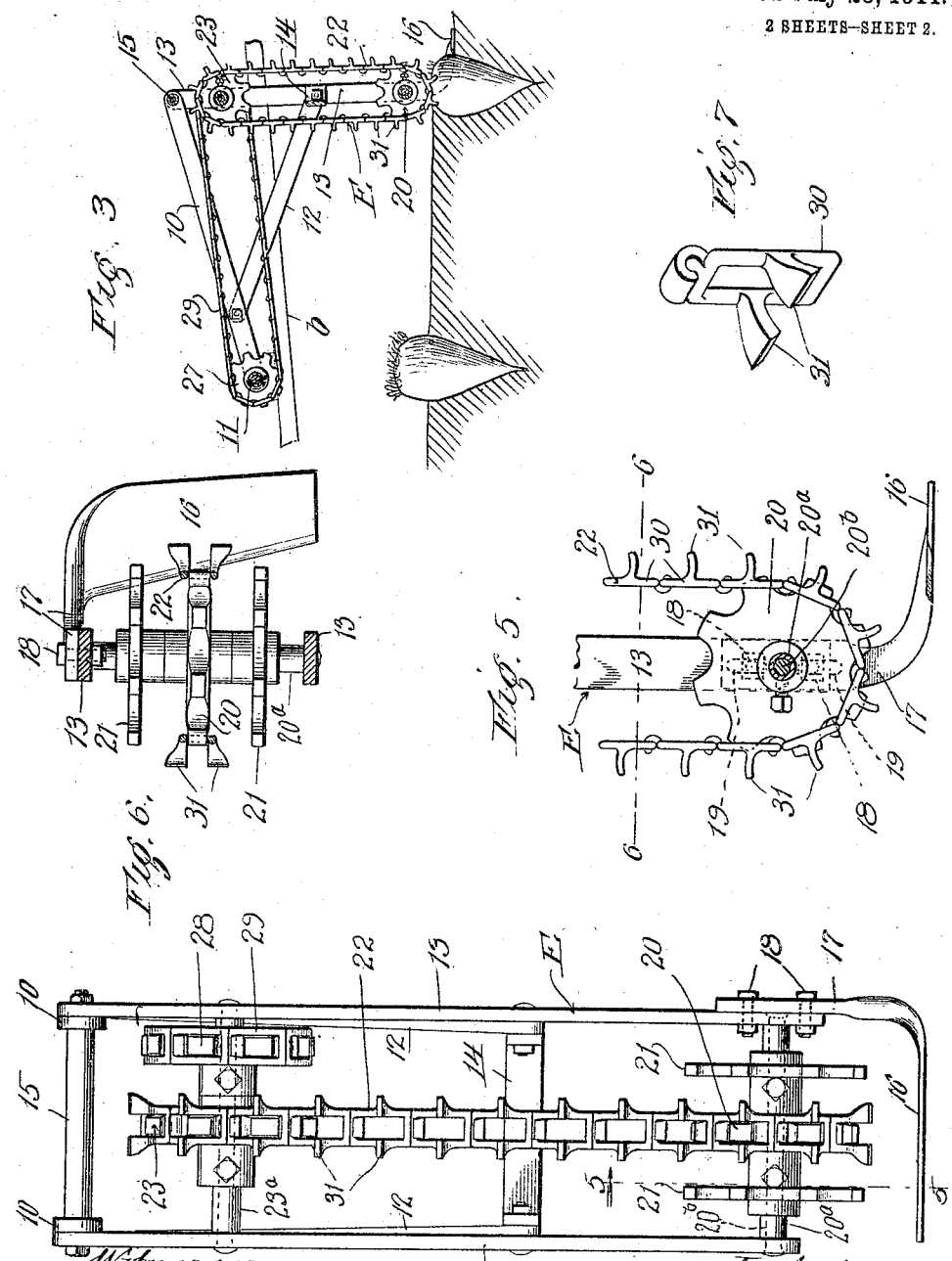

UNITED STATES PATENT OFFICE.

OTTO KNOERZER, OF HAMMOND, INDIANA, ASSIGNOR TO CHAMPION POTATO MACHINERY COMPANY, OF HAMMOND, INDIANA, A CORPORATION OF INDIANA.

BEET-TOPPER FOR BEET-HARVESTERS.

998,851.      Specification of Letters Patent.      Patented July 25, 1911.

Application filed November 1, 1909. Serial No. 525,605.

*To all whom it may concern:*

Be it known that I, OTTO KNOERZER, a citizen of the United States, residing at Hammond, in the county of Lake and State of Indiana, have invented new and useful Improvements in Beet-Toppers for Beet-Harvesters, of which the following is a specification.

This invention relates to beet toppers for beet harvesters, and has for its object to provide an improved beet topper constructed and arranged to automatically cut off a predetermined portion of the tops of beets prior to their removal from the soil, it being well known that the top or upper end of the sugar beet has no commercial value, and is severed from the body of the beet. The position of the beets in the ground varies considerably, some protruding considerably above the ground, whereas others may be practically under the surface of the soil, and this device has been designed to cut off the tops thereof, regardless of their position in the soil.

To such ends this invention consists in a suitably supported frame, a vertically movable head carried thereby and having a traveling chain arranged to contact with the beets, and by following the upper contour thereof, rise to the tops thereof, the head being provided with mechanism for severing the tops at a predetermined distance away from the contacting portion of the chain.

It further consists in the several novel features of construction, arrangement and combinations of parts hereinafter described and more particularly pointed out in the claims.

The invention is clearly illustrated in the drawings furnished herewith, in which—

Figure 1 is a side view of my improved beet topper showing the same mounted upon the frame of an ordinary beet harvester, the other operating mechanism of the harvester itself being omitted for the sake of clearness, Fig. 2 is a plan view of the parts seen in Fig. 1, Fig. 3 is a view of the topper head and a fragment of the supporting frame partly in vertical section and partly in side elevation, the line of section being taken at 3—3 Fig. 2, Fig. 4 is a detail, face view of the head, Fig. 5 is a detail, vertical section taken on the line 5—5 of Fig. 4, Fig. 6 is a detail, horizontal section taken on the line 6—6 of Fig. 5, and Fig. 7 is a perspective view of one of the links which comprise a certain chain which forms part of the topper head.

The construction of beet harvesting machinery is well known, and in general comprises an implement which is propelled along the ground and provided with mechanism for severing the foliage from the beets, cutting off the tops thereof and digging them out of the ground. The present invention has reference solely to the device for cutting off the tops of the beets and may be applied to any well known form of beet harvester and I have shown the same as attached to a harvester frame A, which is mounted upon supporting wheels B, that are secured to an axle C, journaled in bearings *c* carried by the frame A. As shown said frame A, comprises two longitudinally extending bars *b*, which may be connected and braced together in any suitable manner. In use the harvester is preferably connected to a truck D, by means of a yoke piece *d*, and drawn across the field by the horses which are hitched to the truck D.

The topper head is seen at E, and in the form shown, said head is carried by arms 10, which are fulcrumed upon the frame of the machine at 11, whereby the head may oscillate upon said frame in a plane which is substantially vertical. Braces 12, rigidly connect the head with the arms 10, to provide a bodily movable structure capable of being oscillated upon the fulcrum 11.

The head has two upright side members 13, which are connected together by cross bars 14, 15, and as shown the arms 10, connect with the upright members 13, at their upper ends, while the braces 12, connect with the upright members at the point where the cross bar 14, joins said members. The head carries a severing device for cutting off the tops of the beets and as shown said device, in its simplest form, comprises a horizontally extending blade 16, provided upon the end of a post 17, which is adjustably secured to one of the upright members 13, of the head. As shown, bolts and nuts 18, fasten said post to the upright member 13, and said bolts extend through slots 19, in the post, thereby affording vertical adjustment of the knife in order that more or less of the tops of the beets may be removed as is desired.

Mechanism is provided for gaging the distance between the tops of the beets and the point at which it is desired to sever them and as shown said mechanism comprises a sprocket wheel 20, and two toothed disks 21, arranged at the sides of the sprocket wheel 20. The sprocket wheel 20, and toothed disks 21, are rotatively connected together by a sleeve 20ª, journaled upon a spindle 20ᵇ. It is evident that whenever the machine is drawn across the field and the gage mechanism strikes a protruding beet, it will be raised thereby, consequently raising the knife to the proper point below the top edge of the beet to cut off the right amount. If the beet is at the surface or below the same, the gage device will nevertheless properly position the knife with respect to the top edge of the beet.

Mechanism is provided for facilitating the movement of the gage device over the tops of the beets, and as shown said mechanism comprises an endless chain 22, which extends around the sprocket wheel 20, and over a sprocket wheel 23, which is secured upon a sleeve 23ª, journaled upon a spindle secured to the upper ends of the upright members 13, of the topper head. Said sprocket wheel 23, is driven from the supporting wheels B, by suitable mechanism here shown as comprising a sprocket wheel 24, carried by the shaft C, a sprocket chain 25, running over said sprocket wheel 24, and over a sprocket wheel 26, secured upon the spindle or shaft 11. Sprocket wheels 27, 28, are secured upon the shaft 11, and sleeve 23ª, respectively, and are connected by a sprocket chain 29. The gearing just described affords a simple means for continuously moving the chain 22, at a rate of speed somewhat greater than the forward movement of the machine. The links 30, of the chain 22, are provided with claws 31, which project out therefrom and operate to dig into the beets and climb up on the same, thereby preventing the forward movement of the head from pushing the beet forward and acting to push the beets back toward the knife, whereby the knife may engage with the beet and begin cutting at the instant that the gage device reaches the top of the beet.

Some of the beets are completely buried in the ground and as to such beets it is desirable to remove some of the soil adjacent to the tops thereof, and for this reason two plow shares 32, are provided, one on each side of the gage device. Said plow shares may be carried by supports 33, and braces 34, that project down from the frame bars b. Said plow shares are intended to operate where the beets are wholly or almost wholly embedded in the soil, in which case they cut a furrow on each side of the beets and remove the soil adjacent thereto. A stop 35, is provided upon the head E, which strikes the frame and limits the downward movement of the head so that the lower end thereof never falls below the plow shares and preferably stops within say two inches of the bottom.

In operation the machine is drawn across the field with the operator guiding the same over the beets. The gage device runs upon the ground and the knife blade travels through the loose soil just below the surface. Whenever the gage device strikes a beet which is protruding from the ground, the topper head is raised, thereby bringing the knife to the proper position for cutting off the top of the beet. The claws 31, of the chain take hold of and climb the beet, thereby assisting the gage device in raising the head and pushing back the beet. As soon as the knife has severed the top of the beet, the head drops to the ground and travels along the ground and rises and falls with the contour thereof. It is evident that a predetermined amount of each beet will be severed, regardless of its position in the ground.

I realize that various alterations and modifications of this device are possible without departing from the spirit of my invention, and I do not therefore desire to limit myself to the exact form of construction shown and described.

I claim as new and desire to secure by Letters Patent:

1. A beet topper for beet harvesters, comprising an upright movable head, upper and lower sprockets journaled therein, an endless chain trained around said sprockets and having beet engaging claws formed on the links of the chain, gearing for moving said chain around the sprockets and a beet severing mechanism carried by said head.

2. A beet topper for beet harvesters, comprising an upright oscillatory head, upper and lower sprocket wheels journaled therein, an endless sprocket chain passing around said sprocket wheels and having outwardly projecting curved claws that operate to pull in a direction opposite to which the head is traveling, and a severing mechanism carried by said head and moving bodily therewith, said severing mechanism having a knife located below and to the rear of the lowermost sprocket wheel.

3. A beet topper for beet harvesters, comprising an upright oscillatory head, upper and lower sprocket wheels journaled therein, an endless sprocket chain passing around said sprocket wheels and having outwardly extending claws that operate to pull in a direction opposite to the direction of movement of said head, a pair of toothed disks rotatively connected with the lower sprocket wheel, and a severing mechanism secured to said head and moving bodily therewith.

4. A beet topper for beet harvesters, comprising supporting wheels, a frame carried thereby, a head, arms secured to said head and fulcrumed upon the frame at a point in front of the head, upper and lower sprocket wheels journaled in said head, an endless chain running over said sprockets and having outwardly projecting claws that operate to pull in a direction opposite to the direction of movement of the machine and a horizontally extending knife blade adjustably connected with said head and moving bodily therewith.

5. A beet topper for beet harvesters, comprising a frame, supporting wheels, an oscillatory topper head fulcrumed upon said frame and having a gage device and a cutting knife, and plow shares supported from the frame independently of the topper head for removing the soil at the sides of the beets, said plowshares being located beside the gage device and forward of the cutting knife.

In witness whereof, I have hereunto subscribed my name at Hammond, Lake county, Indiana, this 26th day of October A. D. 1909.

OTTO KNOERZER.

Witnesses:
 LEONARD KNOERZER,
 CLAUDE LASATER.